March 9, 1937.  G. R. PEIRSON  2,073,118
TERMINAL
Filed July 19, 1934
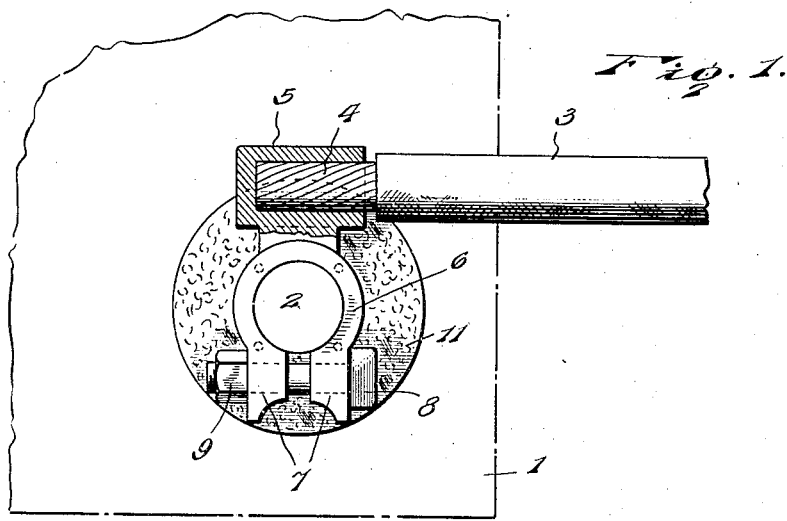
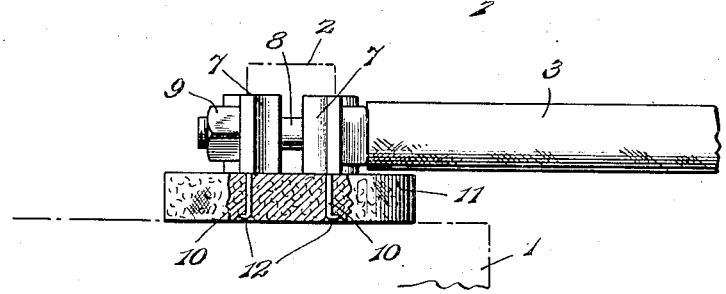
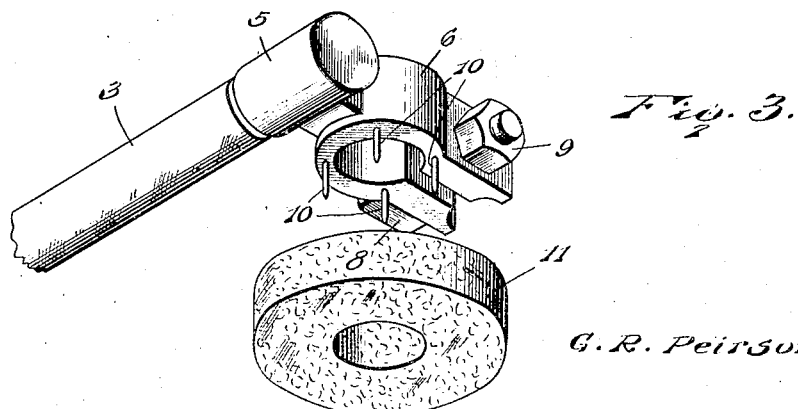
Inventor
G. R. Peirson.
By Lacey & Lacey,
Attorneys Patented Mar. 9, 1937

2,073,118

UNITED STATES PATENT OFFICE 2,073,118

TERMINAL

George R. Peirson, Medicine Lodge, Kans.

Application July 19, 1934, Serial No. 736,118

1 Claim. (Cl. 173—259)

This invention relates to terminals for storage batteries and has for its object the provision of a simple device whereby corrosion around the battery post will be prevented. The invention is illustrated in the accompanying drawing and consists in certain novel features which will be hereinafter first fully described and then particularly defined in the appended claim.

In the drawing:

Figure 1 is a plan view, partly in section, of a terminal embodying the invention.

Figure 2 is an edge elevation of the same.

Figure 3 is a perspective view showing the absorbent washer removed from the clamp but approximately in its proper relation thereto.

A battery is indicated by dotted lines at 1 and a battery post is likewise indicated at 2. A cable is indicated at 3 and it will be observed that the insulating covering of the cable is removed at one end so that said end of the cable, as shown at 4, may be fitted tightly in a sleeve 5 formed on one side of the clamp 6 which is intended to encircle the battery post. At the side opposite the sleeve, the clamp is split and formed with mating lugs 7 through which a securing bolt 8 is inserted, said bolt being equipped with a nut 9 adapted to be turned home against the adjacent lug and thereby firmly secure the clamp around the battery post. In carrying out the present invention, pins or studs 10 are embedded in the lower edge of the clamp so as to depend therefrom and these pins or studs are driven through a washer 11 of wool felt, the ends of the pins or studs being upset against the bottom of the washer, as shown at 12.

The clamp is secured around the battery post in the usual manner, as is obvious, and the washer will be interposed between the clamp and the top of the battery casing, as shown in Figure 2 and as will be understood. The washer is impregnated with oil or similar material which will lubricate the post and will resist corrosion so that when it is necessary to disconnect the cable, breaking of the parts will be avoided and the terminal may be very easily removed. It is well known that, due to the leakage of acids from the battery, corrosion occurs around the battery post and around the top of the battery case and various efforts have been made to overcome this difficulty. The provision of a wool felt washer impregnated with oil and interposed between the clamp and the battery will prevent corrosion and will add only a trifling expense to the ordinary cost of the battery. In the present instance, the washer is fixed to the underside of the clamp so that it will always be in place and cannot be lost when the clamp is removed from the battery to facilitate renewals or repairs. The washer will have no deleterious effect on either the post or the battery, and by occasionally applying a few drops of oil, the proper condition of the washer will be maintained for a long period.

Having thus described the invention, I claim:

A terminal comprising a clamp having a post encircling portion, means for contracting the post encircling portion to bind the same about a battery post, and pins embedded in the under face of the post encircling portion of the clamp in spaced relation to each other circumferentially thereof and depending therefrom, and a washer of absorbent material bearing against the under face of said clamp for disposition between the clamp and the upper surface of a battery to prevent access of corrosive material to the clamp, said pins being of greater length than the thickness of said washer and extending through the washer and having their lower free end portions initially projecting from the washer and bent upwardly and clinched against the under face of the washer and embedded in the washer to hold the washer in place.

GEORGE R. PEIRSON.